(12) United States Patent
Asplund et al.

(10) Patent No.: US 8,437,931 B2
(45) Date of Patent: May 7, 2013

(54) METHOD FOR PERFORMING GEAR SHIFTING

(75) Inventors: Christer Asplund, Kvicksund (SE); Joakim Gäfvert, Kvicksund (SE)

(73) Assignee: Volvo Construction Equipment AB, Eskilstuna (SE)

( * ) Notice: Subject to any disclaimer, the term of this patent is extended or adjusted under 35 U.S.C. 154(b) by 818 days.

(21) Appl. No.: 12/089,747

(22) PCT Filed: Nov. 17, 2005

(86) PCT No.: PCT/SE2005/001739
§ 371 (c)(1),
(2), (4) Date: Apr. 10, 2008

(87) PCT Pub. No.: WO2007/058571
PCT Pub. Date: May 24, 2007

(65) Prior Publication Data
US 2008/0262685 A1     Oct. 23, 2008

(51) Int. Cl.
*G06F 7/00*     (2006.01)

(52) U.S. Cl.
USPC ............. 701/64; 701/58; 701/67; 192/53.1; 192/53.2; 192/3.55; 192/3.56; 192/3.61; 74/339

(58) Field of Classification Search .......... 192/53.1, 192/53.2, 3.55, 3.56, 3.61; 74/339; 477/70, 477/74, 174, 175, 176; 701/67, 58, 64
See application file for complete search history.

(56) References Cited

U.S. PATENT DOCUMENTS

| 5,508,916 A | 4/1996 | Markyvech et al. |
| 5,582,558 A | 12/1996 | Palmieri et al. |
| 5,997,435 A * | 12/1999 | Back .............................. 477/120 |
| 6,571,654 B2 * | 6/2003 | Forsyth ........................... 74/339 |
| 2004/0040814 A1 | 3/2004 | Youk |
| 2004/0154892 A1 | 8/2004 | Coxon et al. |

FOREIGN PATENT DOCUMENTS

| DE | 19530233 A1 | 2/1997 |
| EP | 0873902 A1 | 10/1998 |
| EP | 1167837 A2 | 1/2002 |
| EP | 1433983 A2 | 6/2004 |

OTHER PUBLICATIONS

International Search Report from corresponding PCT/SE2005/001739, Jun. 2006.
Supplemental European Search Report from corresponding European App. EP 05 30 4141, Jan. 2011.

* cited by examiner

*Primary Examiner* — John Q Nguyen
*Assistant Examiner* — Jordan S Fei
(74) *Attorney, Agent, or Firm* — WRB-IP LLP

(57) ABSTRACT

A method for performing gear shifting by engaging a coupling element with a gear wheel includes moving the coupling element relative to the gear wheel from a disengaged position to an engaged position, in which a particular gear is selected. A speed of the coupling element relative to a speed of the gear wheel is controlled during movement of the coupling element so that a speed difference is maintained until the coupling element reaches the engaged position.

11 Claims, 2 Drawing Sheets

METHOD FOR PERFORMING GEAR SHIFTING

BACKGROUND AND SUMMARY

The present invention relates to a method for performing gear shifting by engaging a coupling element with a gear wheel, comprising the step of moving the coupling element relative to the gear wheel from a disengaged position to an engaged position, in which a particular gear is selected. The coupling element normally forms an engagement sleeve.

In one known type of transmission, the gear wheel is axially locked and freely rotatably mounted on a transmission shaft when it is not used to deliver engine power to the transmission shaft. The gear wheel is further in mesh with a secondary gear wheel mounted on a further shaft and is rotated by the further shaft. The engagement sleeve, mounted on the same transmission shaft as the gear wheel, is rotationally fixed by means of splines. The engagement sleeve is therefore movable in the axial direction of the transmission shaft. The gear wheel and the engagement sleeve are provided with further splines for engagement with each other. Thus, the gear wheel can be locked to the transmission shaft with the aid of the engagement sleeve in order to transmit power to the transmission shaft.

Further, according to prior art, the rotation of the gear wheel is synchronized with the rotation of the transmission shaft prior to the engagement sleeve is moved into engagement with the gear wheel. However, shift rejection (gear clashing) often take place during movement of the coupling sleeve as there is not always precise alignment of the splines of the gear wheel and the splines of the coupling sleeve. This may lead to a delayed shifting as the coupling sleeve and the gear wheel may move in unison due to friction between opposite surfaces of the coupling sleeve and the gear wheel.

The invention is particularly related to gear shifting in a vehicle transmission. A vehicle that is powered by an internal combustion engine requires a transmission for shifting gears to effectively transmit the power generated by the engine to the wheels.

Work vehicles are designed to perform relatively short work cycles and therefore change gears frequently. Work vehicles therefore particularly require fast and reliable gear shifting. The term work vehicle comprises different types of material handling vehicles like construction machines, such as a wheel loader, an articulated hauler, a backhoe loader and a motor grader. The invention will be described below in a case in which it is applied in a wheel loader.

The work cycles for a wheel loader may comprise a transportation cycle (>500 m), a load carrying cycle (75-500 m), a close handling cycle (15-75 m) and a short-cycle loading (0-15 m).

During short-cycle loading of for example gravel, the wheel loader is forwarded into a heap of gravel while filling the bucket. The wheel loader is thereafter reversed and turned, driven forwards again and the gravel is unloaded on a container of an articulated hauler or truck. The wheel loader is thereafter reversed and turned again, while returning the bucket to a dig position for repeating the work cycle. Since gears will be shifted frequently, there is a particular need for fast and reliable gear shifting in order to achieve a fast and smooth operation of the wheel loader.

However, the invention is not limited for use in a work vehicle and specifically not to vehicles which repeatedly perform relatively short work cycles. Thus, the invention may for example be applied in other heavy duty vehicles like trucks or buses, or passenger cars.

It is desirable to achieve a faster and more reliable gear shifting and more specifically to guarantee a maximum time for each gear shifting operation. It is particularly desirable to solve the problem of delayed gear shifting due to gear rejection when there is an initial clash/collision between the engagement sleeve and the gear wheel during the gear shifting.

According to an aspect of the present invention, a method comprises moving the coupling element relative to the gear wheel from a disengaged position to an engaged position, in which a particular gear is selected, characterized in that a speed of the coupling element relative to a speed of the gear wheel is controlled during movement of the coupling element so that a speed difference is maintained until the coupling element reaches the engaged position. The term "speed" refers to rotational speed. Thus, the force enabling the axial movement of the coupling element (sleeve) is maintained until engagement is reached.

During operation of the vehicle and before initiation of the gear shifting operation, there is a certain speed difference between the coupling element and the gear wheel. When the gear shifting operation is initiated, a predetermined speed difference is established. The wording "a speed difference is maintained" should not be regarded as limited to that the same speed difference is maintained but instead comprise that the speed difference is changed. Thus, the same speed difference is not necessarily maintained, preferably, there is at no point the same speed.

According to a preferred embodiment, the method involves continuously controlling the speed difference so that it is maintained irrespective of any collision (shift rejection) between engagement means of the coupling element and the gear wheel until the coupling element reaches the engaged position. Thus, the sleeve is continuously forced to move in a circumferential direction relative to the gear wheel during the complete axial movement to engagement independent from any shift rejections during the movement. In other words, the force effecting the sleeve is substantially larger than any counter force arising from such a collision. The engagement means may for example comprise splines or other toothed structure.

According to a preferred embodiment, the method involves ceasing the controlled speed difference between the coupling element and the gear wheel when the engagement position is reached. Preferably, the maintained speed difference is transmitted from the coupling element and the gear wheel to a synchronizer unit when the engagement position is reached. The synchronizer unit preferably comprises two engaging force transmitting elements and the speed difference is absorbed by permitting slippage between the force transmitting elements. The engaging force transmitting elements may be formed by friction discs.

According to a preferred embodiment, the method involves sensing the relative position of the coupling element and the gear wheel for detecting when the engagement position is reached.

Further preferred embodiments of the invention and advantages connected thereto will be apparent from the following drawings, and description.

BRIEF DESCRIPTION OF THE DRAWINGS

The invention will be explained below, with reference to the embodiments shown on the appended drawings, wherein FIG. 1 schematically shows a part of a transmission for performing the gear shifting method.

DETAILED DESCRIPTION

Figure 1:
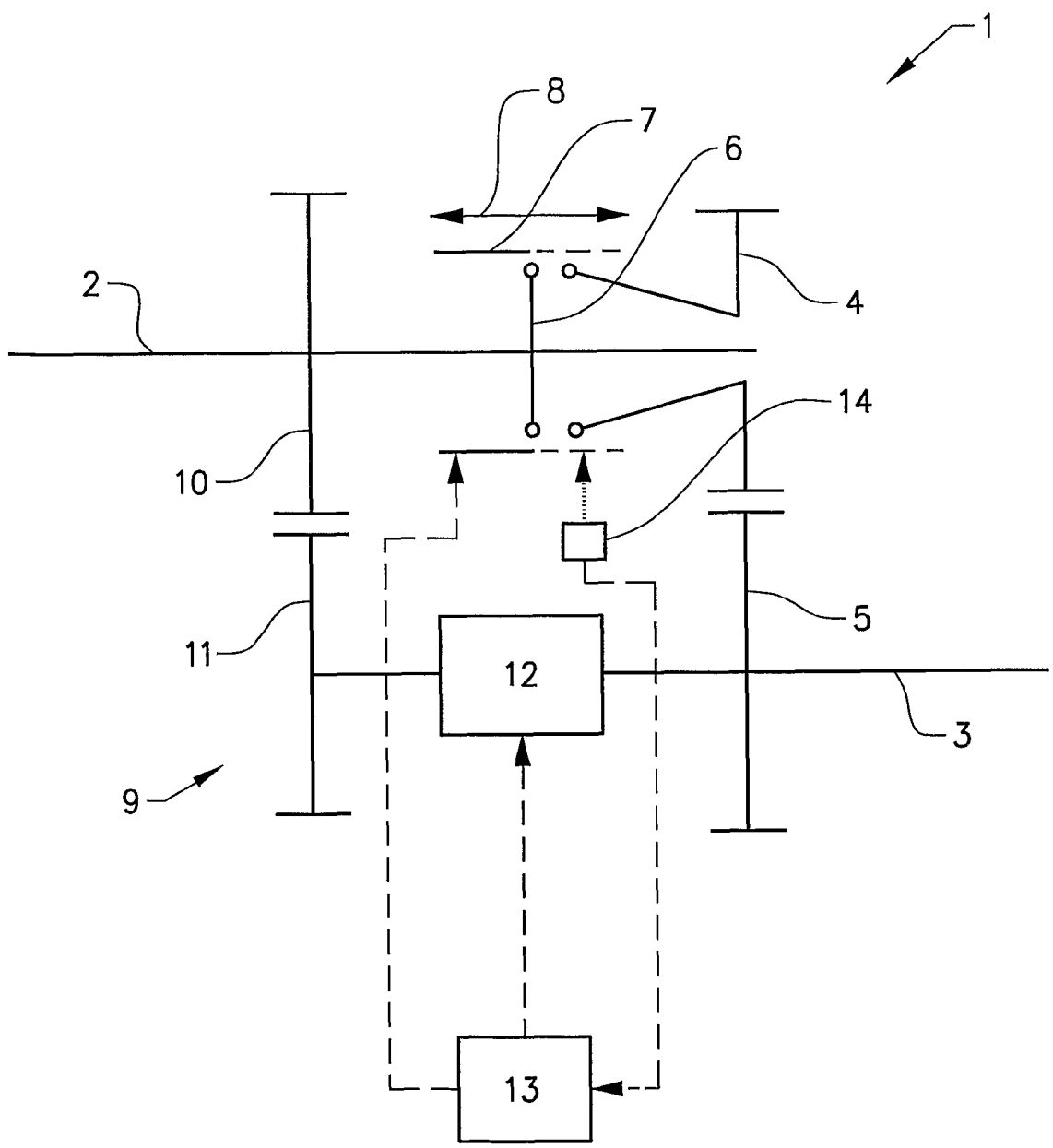

FIG. 1 schematically shows a part of a vehicle transmission 1. The transmission 1 comprises two parallel transmission shafts 2, 3 in the form of an input shaft 2 and an output shaft 3. A first gear wheel 4 is axially locked and freely rotatably mounted on the input shaft 2 when it is not used to transfer engine power from the shaft 2. The first gear wheel 4 is further in mesh with a second gear wheel 5, which is rotationally locked on the output shaft 3.

An inner hub 6 is rotationally locked to the input shaft 2 and thus rotates therewith. A coupling element 7, in the form of an outer actuator sleeve, is axially movably arranged relative to the hub 6, see arrow 8. The outer sleeve 7 has internal splines that mesh with external splines on the inner hub 6. Thus, the sleeve 7 rotates at the same speed as the input shaft 2.

The first gear wheel 4 and the outer sleeve 7 are provided with further means (for example splines) for engagement with each other. Thus, the gear wheel 4 can be locked to the input shaft 2 with the aid of the coupling sleeve 7 in order to transmit power from the input shaft 2 to the output shaft 3.

A synchronizing arrangement 9 is arranged to synchronize the speed of the input shaft relative to the output shaft during gear shifting. The synchronizing arrangement 9 comprises a first synchronizing gear wheel 10, which is rotationally locked to the input shaft 2, and a second synchronizing gear wheel 11, which is in mesh with the first synchronizing gear wheel 10.

The synchronizing arrangement 9 further comprises a synchronizer unit 12 operatively arranged between the output shaft 3 and the second synchronizing gear wheel 11. The synchronizer unit 12 comprises means for engaging and disengaging, respectively, the second synchronizing gear wheel 11 to a driving connection with the output shaft 3. More specifically, the synchronizer unit 12 is adapted for achieving a gradual engagement of the second synchronizing gear wheel 11 with the output shaft 3. More specifically, the engagement means in the synchronizer unit 12 is adapted for permitting a relative rotation of the second synchronizing gear wheel 11 and the output shaft 3. According to a preferred example, the engagement means in the synchronizer unit 12 comprises at least two engaging friction discs, which are rotationally locked on different shafts.

When the synchronizer unit 12 is in a completely engaged state, the second synchronizer gear wheel 11 rotates at the same speed as the output shaft 3. The synchronizer gear wheels 10, 11 are designed so that a desired, predetermined speed difference between the input shaft 2 (and thus the coupling sleeve 7) and the first gear wheel 4 is achieved when the synchronizer unit 12 is in the engaged state.

A shift element, or selector fork (not shown), is arranged to engage a groove in an outer surface of the outer sleeve 7 and is actuatable by means of a control unit 13 to slide the sleeve 7 relative to the inner hub 6 on the meshed splines in an axial direction relative to the input shaft 2. During movement of the outer sleeve 7, the inner splines of the outer sleeve 7 engage outer splines on the first gear wheel 4.

Further, a sensor 14 is arranged for sensing the relative position of the outer sleeve 7 and the first gear wheel 4 for detecting when the engagement position is reached. A signal is established and sent to the control unit 13 when the engagement position is reached.

Figure 2:
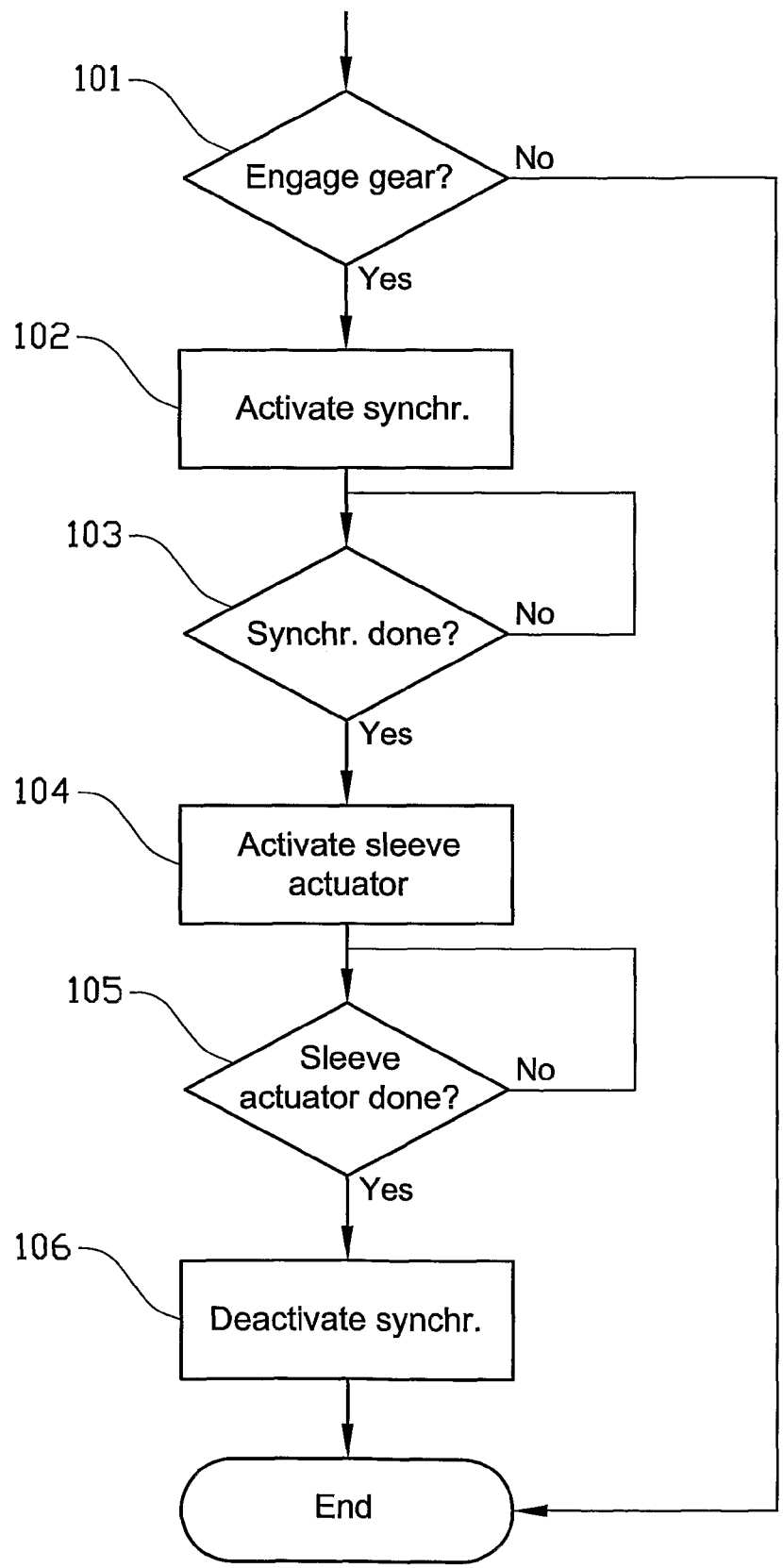
FIG. 2 shows a first embodiment of the gear shifting method in a flow chart.

FIG. 2 shows a first embodiment of the gear shifting method in a flow chart. In a first step 101, the control unit 13 requests if the first gear wheel 4 should be engaged. If a positive answer is received, in a second step 102, the synchronizer unit 12 is activated. The synchronizer unit 12 now establishes a predetermined, relatively small speed difference between the coupling sleeve 7 and the first gear wheel 4.

In a third step 103, it is checked that the desired speed difference is achieved. In a fourth step 104, the coupling sleeve 7 is moved from a disengaged position towards an engaged position with the first gear wheel 4. A speed of the coupling sleeve 7 is controlled relative to a speed of the first gear wheel 4 during movement of the coupling sleeve 7 so that the speed difference is maintained until the coupling sleeve 7 reaches the engaged position.

More specifically, the speed difference is continuously controlled so that it is maintained, at least to some degree, irrespective of any collision between engagement means of the coupling sleeve 7 and the first gear wheel 4 until the coupling sleeve reaches the engaged position. Thus, the movement of the coupling sleeve 7 is actively controlled by means of the control unit 13 in order to firstly establish a speed difference and secondly maintaining the speed difference during engagement of the coupling sleeve 7 and the first gear wheel 4. Since a torque of the synchronizing unit 12 is much larger than a friction torque between the opposite surfaces of the coupling sleeve 7 and the first gear wheel 4, the speed difference will be maintained.

In a fifth step 105, it is checked if engagement is achieved. If a positive answer is received, in a sixth step 106, the synchronizer unit 12 is deactivated. Thus, the controlled speed difference between the coupling sleeve 7 and the first gear wheel 4 is terminated when the engagement position is reached. More specifically, the maintained speed difference is transmitted from the coupling sleeve 7 and the first gear wheel 4 to the synchronizer unit 12 when the engagement position is reached. The speed difference is absorbed by permitting the frictions discs in the synchronizer unit to slip relative to each other. Thus, the synchronizing unit should be designed to tolerate speed differences at high torques.

The position sensor 14 detects when the coupling sleeve 7 has reached the engagement position and sends a signal to the control unit 13 when the engagement position is reached. The control unit 13 disengages/turns off the synchronizer unit 12 upon receival of the signal.

According to a first example, the transmission 1 is comprised in a gearbox forming an electrically-controlled automatic gearbox of the "power-shift" type. Such transmissions are well known in the art and will therefore not be further described here. The above described gear shifting operation is then used for a pre-selection of a specific gear wheel on a non-driven layshaft. Gear shifting takes place subsequently when the layshaft is brought to a driving connection with the engine.

The control unit 13 comprises a memory, which in turn comprises a computer program with computer program segments, or a program code, for implementing the gear shifting method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

The invention also relates to a computer program product comprising computer program segments stored on a computer-readable means for implementing the gear shifting method when the program is run. The computer program product can comprise, for example, a diskette or a CD.

The invention is not in any way limited to the above described embodiments, instead a number of alternatives and modifications are possible without departing from the scope of the following claims.

The above described synchronizer unit 12 should only be regarded as an example. Other solutions are also feasible, using for example synchronizing cones or an electric motor as an alternative/complement to the friction discs.

The invention may for example be applied in a manual gear box.

As an alternative to using a position sensor for determining when the engagement position is reached, a rotational speed difference between the two transmission shafts 2,3 may be monitored. When a predetermined value of the speed difference (depending on the gear change between the shafts) is detected during engagement, the engagement position is regarded as achieved.

The invention claimed is:

1. Method for performing gear shifting by engaging a coupling element with a gear wheel, wherein the gear wheel is adapted to be locked to an input shaft with the aid of the coupling element in order to transmit power from the input shaft to an output shaft, comprising
    moving the coupling element relative to the gear wheel from a disengaged position to an engaged position, in which a particular gear is selected,
    controlling a rotational speed of the coupling element relative to a rotational speed of the gear wheel by a synchronizing arrangement, the synchronizing arrangement comprising a first synchronizing gear wheel which is rotationally locked to the input shaft, and a second synchronizing gear wheel which is in mesh with the first synchronizing gear wheel, and a synchronizer unit operatively arranged between the output shaft and the second synchronizing gear wheel, wherein the synchronizer gear wheels are designed so that a desired, predetermined speed difference between the input shaft and the gear wheel is achieved when the synchronizer unit is in an engaged state, and
    controlling a rotational speed of the coupling element during movement of the coupling element so that the speed difference is maintained until the coupling element reaches the engaged position.

2. A method according to claim 1, comprising continuously controlling the speed difference so that it is maintained irrespective of any collision between engagement means of the coupling element and the gear wheel until the coupling element reaches the engaged position.

3. A method according to claim 1 comprising moving the coupling element relative to a shaft on which the coupling element is disposed in a rotationally locked manner.

4. A method according to claim 1, comprising ceasing the controlled speed difference between the coupling element and the gear wheel when the engaged position is reached.

5. A method according to claim 1, comprising transmitting the maintained speed difference from the coupling element and the gear wheel to a synchronizer unit when the engaged position is reached.

6. A method according to claim 5, comprising permitting slippage between two engaging force transmitting elements in the synchronizer unit.

7. A method according to claim 1, comprising sensing a relative position of the coupling element and the gear wheel for detecting when the engaged position is reached.

8. A method according to claim 1, comprising establishing a signal when the engaged position is reached.

9. A non-transitory computer readable medium comprising a computer program for implementing the method as claimed in claim 1 when the program is run on a computer.

10. A computer program product comprising computer program segments stored on a computer-readable means for implementing the method as claimed in claim 1 when the program is run on a computer.

11. A gear shifting arrangement, comprising
    two parallel transmission shafts in the form of an input shaft and an output shaft,
    a first gear wheel, the first gear wheel being axially locked to and freely rotatably mounted on the input shaft when the first gear wheel is not used to transfer engine power from the input shaft,
    a second gear wheel, the first gear wheel being further in mesh with the second gear wheel, the second gear wheel being rotationally locked on the output shaft,
    a synchronizing arrangement arranged to synchronize a speed of the input shall relative to a speed of the output shaft during gear shifting, the synchronizing arrangement comprising a synchronizing unit, a first synchronizing gear wheel that is rotationally locked to the input shaft, and a second synchronizing gear wheel that is in mesh with the first synchronizing gear wheel,
    wherein the synchronizer gear wheels are designed so that a desired, predetermined speed difference between the input shaft and the first gear wheel is achieved when the synchronizer unit is in an engaged state.

* * * * *